Feb. 22, 1966 H. WILL 3,237,015

CIRCUIT ARRANGEMENT FOR PRODUCING BIPOLAR IMPULSE PAIRS

Filed Sept. 13, 1960

2 Sheets-Sheet 1

Feb. 22, 1966 H. WILL 3,237,015

CIRCUIT ARRANGEMENT FOR PRODUCING BIPOLAR IMPULSE PAIRS

Filed Sept. 13, 1960 2 Sheets-Sheet 2

United States Patent Office 3,237,015
Patented Feb. 22, 1966

3,237,015

CIRCUIT ARRANGEMENT FOR PRODUCING BIPOLAR IMPULSE PAIRS

Helmut Will, Munich, Germany, assignor to Siemens & Halske Aktiengesellschaft, Berlin and Munich, Germany, a corporation of Germany Filed Sept. 13, 1960, Ser. No. 55,618
Claims priority, application Germany, Sept. 25, 1959, S 65,121
4 Claims. (Cl. 307—88)

Figure 1:
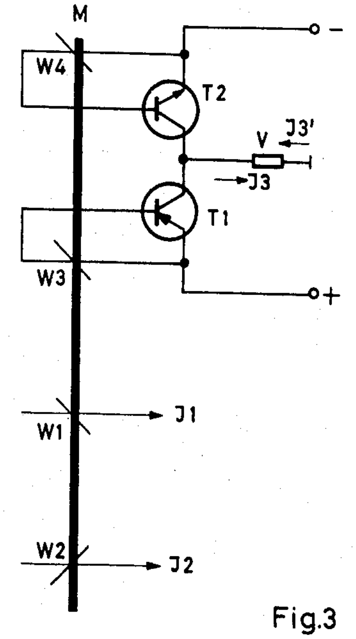

This invention is concerned with a circuit arrangement for producing bipolar impulse pairs, especially current impulses for triggering magnet cores with approximately rectangular hysteresis loop which are arranged in the manner of a matrix, comprising two transistors coupled with a magnet core, wherein one transistor is made conductive responsive to magnetization of the core in one direction while the other transistor is made conductive responsive to magnetization of the core in the other direction.

The use of a transistor coupled with a magnet core, to operate as an impulse amplifier, is known. It is moreover known to obtain a high amplification factor by feeding back the current impulse delivered by a transistor, over a magnet core winding to the emitter-base path of the transistor, the input impulse being in such case merely operative to initiate the reverse polarization of the magnet core while the feedback current effects completion thereof. However, the known circuit arrangements deliver only impulses of one polarity. The production of bipolar impulse pairs is with these arrangements impossible.

The object of the invention is to provide a circuit arrangement which is adapted to produce successive positive and negative impulses, that is, bipolar impulse pairs. Circuit arrangements of this kind are required, for example, in the impulse storage technique for the triggering of magnet core storers. Such triggering circuits constitute especially in connection with small storers a great part of the total expenditure. It is accordingly desirable to produce, with the least possible expenditure, triggering circuits taking into account simple construction of the decoding device with the required timing means.

According to the invention, this object is realized by coupling a magnet core with preferably rectangular hysteresis loop with two transistors in such a manner that one transistor is made conductive upon magnetization of the core in one direction while the other transistor is made conductive responsive to magnetization of the core in the other direction. The two transistors coupled with the magnet core may be of identical or of opposite conduction type. The magnet core is provided with four windings; two of such windings being connected in series with the emitter-base paths of the respective transistors, one winding serving for connecting the reverse polarization current, and the fourth winding serving for the connection of the bias polarization current. It was, for reasons of reproduceability of the circuit arrangement, found particularly advisable to determine by the switching time of the magnet core the duration of the positive and negative impulses given off. The switching time of magnet cores of identical size and of identical material is under identical operating conditions very constant, while the storage time of transistors of identical type, affected by the charge carrier storage action, with identical triggering, widely varies.

A circuit arrangement according to the invention, based upon recognition of this fact, provides a resistor connected respectively in parallel to the series circuit of the emitter-base path of one of the two transistors and the winding of the magnet core connected therewith, which is transversed by a current, so that the voltage drop thereon maintains reliable blocking of the respectively associated transistor as long as the bias magnetization of the core is not reversed. The end of each of the two transistors which is connected with the emitter of the respectively associated transistor is over a diode rectifier connected with a first potential and the other end thereof is connected with a second potential which is higher than the first potential. The device for utilizing the bipolar impulses (load) can be connected directly to the mutually interconnected collectors of the two transistors.

The supply of the bias magnetization current and of the reverse magnetization current can be effected in two different ways. It is first of all possible to supply the bias magnetization current with fixed magnitude over a winding of the magnet core and to make the reverse magnetization current, flowing over a second winding of the magnet core, so high that it compensates the action of the bias magnetization current while being over and above such effect sufficient for magnetizing the magnet core to assume the other remanence condition. It is in connection with a circuit arrangement operating according to this principle advantageous to connect the winding of the magnet core which carries the bias magnetization current on the one hand over a rectifier with the emitter of one of the transistors which lies over a resistor on a first potential and on the other hand with a second potential which is positive with respect to the first potential. The winding provided for the supply of the reverse magnetization current is thereby arranged in the collector circuit of a further transistor which is, for example, controlled over its base electrode.

Figure 2:
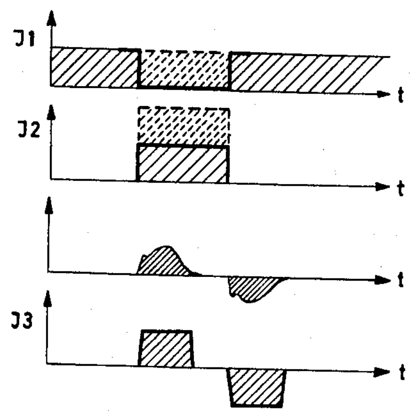
Figures 3, 4:
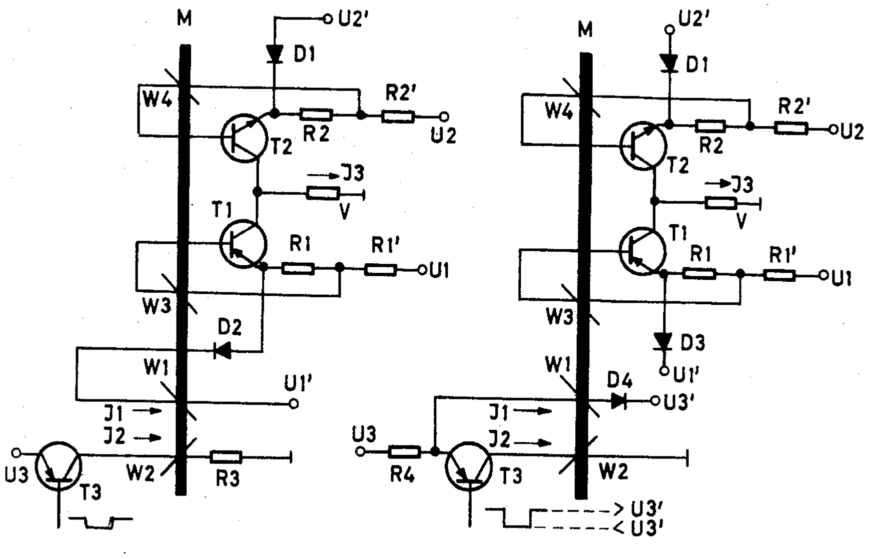
Figure 5:
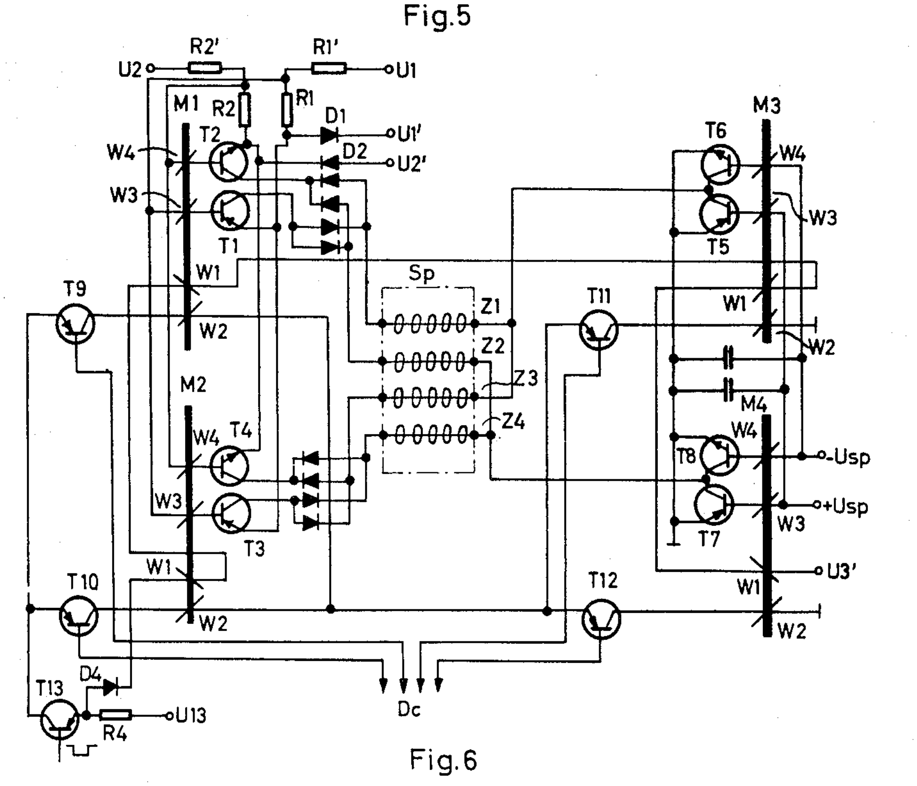
Figure 6:
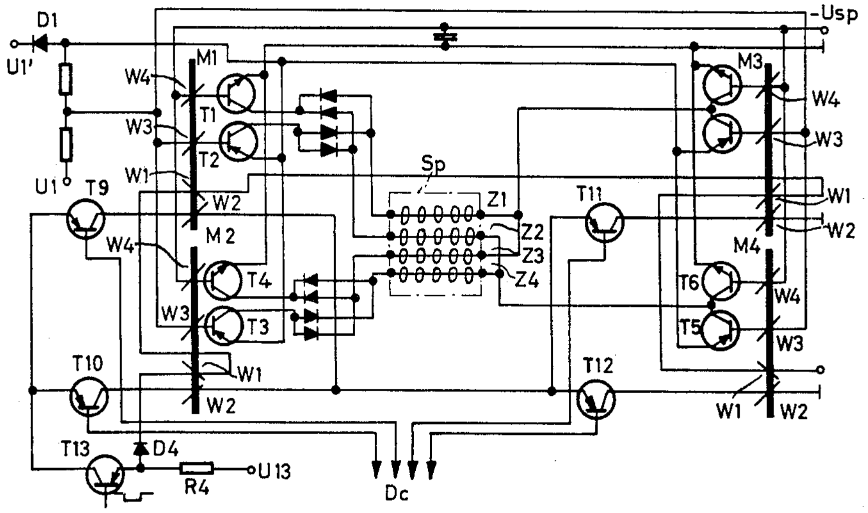

However, it is also possible, and in view of the magnitude of the reverse magnetization current particularly advantageous, to interrupt the bias magnetization current for the duration of the reverse magnetization operation. In such an arrangement, the reverse magnetization current need be only high enough to effect reversal of the magnetization of the magnet core. The action of the bias magnetization current need not be compensated. Accordingly, the reverse magnetization current can be lower by the value of the bias magnetization current. In a circuit arrangement operating in this manner, the bias magnetization winding is not connected with the emitter of one of the transistors which produces the bipolar impulses, but respectively with the emitter of the third transistor and over a rectifier diode with a further potential. The various objects and features of the invention will appear from the description of embodiments which is rendered below with reference to the accompanying drawings. In the drawings, FIG. 1 shows the principle of construction of a circuit arrangement according to the invention;

FIG. 2 represents an impulse diagram of a circuit according to FIG. 1;

FIG. 3 indicates an embodiment in basic respects similar to FIG. 1, with two transistors the collectors of which are interconnected and connected with a load, and a further transistor which is controlled over its base electrode;

FIG. 4 illustrates an embodiment in which the bias magnetization current is disconnected for the duration of the reverse magnetization current; and FIGS. 5 and 6 show circuit arrangements for triggering storage cores.

Referring now to FIG. 1, M indicates a magnet core having windings W1, W2, W3 and W4 and two transistors T1 and T2 which are assumed to be of opposite conduction type. This is by no means necessary, but offers some advantages so far as circuitry is concerned. The bias magnetization current is supplied over the winding W1 and the reverse magnetization current is supplied over the winding W2. The winding W3 is connected in series with the emitter-base path of the transistor T1 and the winding W4 is connected in series with the emitter-base path of the transistor T2. To the mutually interconnected collectors of the transistors T1 and T2 is connected the load V. The bipolar pulses are given off to the load V in the following manner:

The magnet core is magnetized in a direction opposite to the bias magnetization thereof by the reverse magnetization current J2 flowing over the winding W2 and remains even after decay of this current in the remanence position corresponding to the respective magnetization direction. Upon reverse magnetization of a magnet core with approximately rectangular hysteresis loop, a voltage is in konwn manner induced in all windings connected with such core. Accordingly, a voltage is induced in the windings W3 and W4 of the magnet core M which is, however, owing to the sense of direction of these two windings merely effective to make the transistor T1 conductive while the transistor T2 remains blocked. The reverse magnetization by means of the current J2 is therefore effective to deliver over the transistor T1 a current J3 to the load V. Upon restoring the magnetization of the magnet core M by means of the bias magnetization current J1 flowing over the winding W1, to the initial condition, there will appear in the windings W3 and W4 a voltage of opposite polarity which causes the transistor T2 to become conductive, while the transistor T1 is blocked. Accordingly, the bias magnetization of the magnet core M by means of the current J1 effects delivery of a current J3′ to the load V, such current flowing through the load in a direction opposite to that of the current J3. Magnetization of the magnet core in a full cycle of magnetization in one and the other direction is therefore effective to deliver to the load V a bipolar impulse pair.

FIG. 2 shows an impulse diagram for such a circuit arrangement. The second line from the top indicates the time course of the reverse magnetization current J2 and the top line indicates the time course of the bias magnetization current J1. Line 3 represents the voltages given off by the magnet core M. These voltages which are effective in the windings W3 and W4 cause the transistors T1 and T2 to become conductive and thereby effect delivery of output impulses J3 and J3′ to the load V. The course of the impulses relative to time is represented in line 4 of FIG. 2.

Lines 1 and 2 of FIG. 2 also show how the reverse magnetization current and the bias magnetization current are mutually related in time and how they are dimensioned as to the magnitude thereof. In the case indicated in dash lines, the bias magnetization current J1 is present with constant magnitude. The reverse magnetization current J2 is at the desired instant connected to the winding W2 of the magnet core and must be of a value such that it compensates the effect of the bias magnetization current, which flows constantly over the winding W1, and that it also magnetizes the magnet core M in reverse direction. However, it is in view of the current expenditure for the reverse magnetization more favorable to disconnect the bias magnetization current J1 flowing over the winding W1, during the time when the reverse magnetization current flows over the winding W2. The time course of the two currents J1 and J2 is shown in FIG. 2, lines 1 and 2, in full lines.

The circuit arrangement shown in FIG. 3 comprises again a magnet core M with windings W1, W2, W3 and W4 and two transistors T1 and T2 the collectors of which are interconnected and connected to a load V. There is also provided a transistor T3 which is controlled over its base electrode and delivers the reverse magnetization current J2 over the winding W2 which is connected with its collector. A resistor respectively indicated at R1 and R2 is respectively connected in series with the emitter-base path of the respective transistors T1 and T2 in order to make the duration of the bipolar pulses given off from the two transistors T1 and T2 independent of the charge carrier storage effect of the transistors and to determine such duration only by the switching time of the magnet core M, these two resistors R1 and R2 being traversed by constant currents which are produced by connecting the ends of the resistors R1 and R2, which are connected with the emitters of the respectively associated transistors, respectively over rectifier diodes D1 and D2, to a first potential and over respective resistors R1′ and R2′ to a second potential. As will be seen from FIG. 3, the current flowing over the resistors R1 and R1′ as well as over the diode rectifier D2 serves also for producing the bias magnetization current J1 in the winding W1 of the magnet core M. The potential U1′ thereby corresponds to the potential U2′ of the transistor T2. The effect of the arrangement of the resistors R1 and R2 in the emitter-base circuits of the transistors T1 and T2 and the constant currents flowing therethrough is that the transistors are blocked as long as no voltage is induced in the windings W3 and W4 connected therewith. It must be considered in this connection that the two transistors T1 and T2 receive, due to the voltage drop at the two resistors R1 and R2, a bias which is sufficient to effectively block the transistors. However, as soon as a voltage of appropriate polarity is induced in one of the two windings W3 and W4, this bias is cancelled at the emitter-base path of the respectively associated transistor and such transistor is made conductive by the residual voltage. The duration of an impulse given off by an opened transistor is thereby made dependent only upon the switching time of the magnet core M which is a function of the amplitude of the reverse magnetization current J2 and of the bias magnetization current J1, respectively. This switching time of the magnet core may be influenced, for example, by the provision of one or more auxiliary windings upon the core, over which are conducted the collector currents of the transistors T1 and T2.

The arrangement operates as follows:

At a desired instant, the transistor T3 is made conductive over its base electrode. Accordingly, a current will flow from the voltage source U3 over the transistor T3 and the winding W2 which is connected in its collector circuit and over resistor R3 to ground, such current being sufficient to compensate the bias magnetization current flowing over the winding W1 and to magnetize the magnet core M in the opposite direction. Such reverse magnetization induces in each of the respective windings W3 and W4 a voltage of a magnitude such that the bias produced by the aid of the resistor R1 is overcome, the induced voltage being, for example, directed so that the transistor T1 receives a charge carrier injection, thereby becoming conductive and giving off an impulse to the load V which is connected to its collector circuit. At the instant at which the transistor T3 is again blocked, owing to the decaying control impulse at its base, the reverse magnetization current J2 will cease to flow over the winding W2 and there will accordingly only remain the bias magnetization current J1 flowing over the winding W1. This current J1 magnetizes the magnet core M in its original direction, thereby inducing a voltage impulse in the windings W3 and W4.

The voltage in the winding W3 is now directed so that the transistor T1 is blocked. The transistor T2 is however opened by the voltage flowing in the winding W4, the magnitude of such voltage being such that the emitter bias voltage at the resistor R2 is compensated, thus making the transistor T2 conductive. The spacing of the leading flanks of the impulses given off by the respective transistors T1 and T2 corresponds exactly to the duration of the control impulse conducted to the base of the transistor T3.

FIG. 4 shows a circuit arrangement according to the invention, in which the bias magnetization current J1 flowing over the winding W1, is disconnected for the duration of the reverse magnetization current J2. This is obtained by connecting the winding W1 on the one hand to the emitter of the transistor T3 and on the other hand over a diode rectifier D4 to a potential U3′. The auxiliary current flowing for the production of the emitter bias of the transistor T1 over the resistors R1 and R1′ is now produced in the same manner as in case of the transistor T2, namely, over a diode rectifier D3 one terminal of which is connected to the emitter of the transistor T1 while the other terminal is connected to the potential U1. The bias magnetization current will flow from the voltage source U3 over the resistor R4, winding W1 and the rectifier D4, such condition continuing so long as the transistor T3 is not conducting. However, as soon as the transistor T3 is made conductive by a control impulse supplied thereto, current will flow from the potential source U3 over resistor R4 and transistor T3 through the winding W2, such current serving for the reverse magnetization of the magnet core M. The bias magnetization current normally flowing over the winding W1 and the rectifier D4 to the potential U3′, cannot continue to flow in this switching condition, since the potential at the emitter of the transistor T3 is nearly at ground potential and thereby preventing in view of the rectifier D4 current flow over the winding W1. The operation of the transistors T1 and T2 corresponds in this circuit arrangement to that of the transistors T1 and T2 in FIG. 3.

FIG. 5 shows a circuit for triggering storage cores, such circuit comprising four circuit arrangements which respectively correspond to the arrangement described in connection with FIG. 4. There are, accordingly, four magnet cores M1 to M4 and transistors T1 to T8. Transistors T9, T10, T11 and T12 are provided for respectively controlling the magnet cores M1 to M4, such transistors being respectively connected with the windings W2 of the associated magnet cores and with a decoding device D*c*. The voltage sources U1–U1′ and U2–U2′ are common to the transistors T1 to T4. The blocking voltages $-$U*sp* and $+$U*sp* are common to the transistors T5 to T8. The windings W1 of all cores are connected in serial relationship and are traversed by current from the source U3. The output electrodes of the transistors T1 to T4 are over decoupling rectifiers connected with the output electrodes of the transistors T5 to T8, thereby producing a total of four connecting paths or channels in which are included the storage cores as indicated along the rows Z1 to Z4.

When it is, for example, desired to supply a bipolar impulse sequence to the matrix row Z2, the decoder DC will cause the transistors T9 and T12 to become conductive. The control current connected over the transistor T3 effects with respect to the cores M1 and M4 disconnection of the bias magnetization current flowing over the windings W1 and switching-in of the reverse magnetization current over the windings W2. The magnet cores M1 and M4 return to the initial condition upon decay of the control pulse at the transistor T13.

This interplay between the bias and reverse magnetization produces, as explained before, a bipolar impulse pair which is given off to the matrix row Z2 of the matrix storage device S*p*.

The circuit arrangement according to FIG. 6 corresponds in its functions exactly to the one illustrated in FIG. 5 but uses only voltages U1, U1′ and $-$U*sp* in place of the voltages U1, U1′, U2, U2′, $-$U*sp* and $+$U*sp* provided in FIG. 5.

The circuit arrangement according to the invention results as compared with other triggering devices in far-reaching reduction of the expenditure in the decoder and in the timing provisions. For example, in previously known arrangements, the energy for the reverse magnetization of the storage cores is supplied by the timing means. The currents which thereby occur, and which must be conducted over transistor switches controlled by the decoder, are generally of a magnitude such that these switches can be actuated from the decoder only by the use of intermediate amplifiers. In the above described circuit arrangements, the timing means delivers only the energy required for the reverse magnetization of the switching cores and for the triggering of the transistors associated with these switching cores. The magnitudes of the currents and voltages required for these purposes are as compared with the prior arrangements so much lower that the timing supply can be made simpler and that the transistor switches which serve for the selection can be actuated directly from the decoder without the use of intermediate amplifiers.

In the circuit arrangements shown in FIGS. 5 and 6, the transistors are operated as active switches. There is, however, also the possibility to utilize the transistors as passive switches by employing, instead of the voltage sources U1 and U2, current impulse sources with impulse delivery coinciding in time with the switching operations.

Changes may be made within the scope and spirit of the appended claims which define what is believed to be new and desired to have protected by Letters Patent.

I claim:

1. A circuit arrangement for producing bipolar impulse pairs for triggering magnet cores, comprising a magnet core with at least approximately rectangular hysteresis loop, four windings cooperatively associated with said magnet core, two transistors, circuit means for connecting two of said windings respectively in series with the emitter-base paths of the respective transistors, circuit means for respectively supplying over the third and the fourth windings bias magnetization current and reverse magnetization current, whereby one of said transistors is made conductive responsive to magnetization of said core in one direction while the other transistor is made conductive responsive to magnetization of said core in the other direction, and a bipolar impulse is produced, a resistor connected in series with the respective serially connected emitter-base paths of each of said transistors and the respective core winding cooperatively associated therewith, and means for causing a current to flow over the respective resistors to produce a voltage drop for blocking the corresponding transistor in the absence of reverse magnetization of said core.

2. A circuit arrangement according to claim 1, comprising a further transistor, circuit means for connecting the core winding over which is supplied reverse magnetization current in the collector circuit of said further transistor, circuit means for connecting one terminal of the core winding over which is supplied bias magnetization current with the emitter of said further transistor, and circuit means including a rectifier for connecting the other terminal of said winding with a further potential.

3. A circuit arrangement according to claim 1, comprising for cooperation with each of said resistors a rectifier and a further resistor, means for connecting said rectifier to the end of the respective first named resistor which is connected with the emitter of the respectively associated transistor, means for connecting said further resistor with the other end of the corresponding first named resistor, means for connecting said rectifier to a first potential, and means for connecting said further resistor to a second potential which is positive with respect to said first potential.

4. A circuit arrangement according to claim 3, comprising circuit means including a rectifier for connecting the winding over which is supplied bias magnetization current with the emitter of one of said transistors and with a second potential which is positive with respect to said first potential.

References Cited by the Examiner

UNITED STATES PATENTS

| | | | |
|---|---|---|---|
| 2,959,686 | 11/1960 | Guterman | 307—88.5 |
| 2,981,848 | 4/1961 | Frantz | 307—88 |
| 3,054,066 | 9/1962 | Crane | 307—88.5 X |

IRVING L. SRAGOW *Primary Examiner.*

JOHN F. BURNS, *Examiner.*